(12) United States Patent
Prusek

(10) Patent No.: US 11,534,874 B2
(45) Date of Patent: Dec. 27, 2022

(54) PORTABLE DEVICE FOR PRECISION PLASMA AND OXY-FUEL TORCH CUTTING

(71) Applicant: Jerry Prusek, Coeur D'alene, ID (US)

(72) Inventor: Jerry Prusek, Coeur D'alene, ID (US)

(*) Notice: Subject to any disclaimer, the term of this patent is extended or adjusted under 35 U.S.C. 154(b) by 443 days.

(21) Appl. No.: 16/732,259

(22) Filed: Dec. 31, 2019

(65) Prior Publication Data

US 2021/0197324 A1 Jul. 1, 2021

(51) Int. Cl.
| | |
|---|---|
| *B23K 37/02* | (2006.01) |
| *F16H 19/04* | (2006.01) |
| *B23K 7/10* | (2006.01) |
| *F16F 15/30* | (2006.01) |
| *B23K 10/00* | (2006.01) |
| *B23K 7/00* | (2006.01) |

(52) U.S. Cl.
CPC .......... *B23K 37/0211* (2013.01); *B23K 7/002* (2013.01); *B23K 7/102* (2013.01); *B23K 10/00* (2013.01); *B23K 37/0241* (2013.01); *B23K 37/0247* (2013.01); *B23K 37/0252* (2013.01); *B23K 37/0288* (2013.01); *F16F 15/30* (2013.01); *F16H 19/04* (2013.01)

(58) Field of Classification Search
None
See application file for complete search history.

(56) References Cited

U.S. PATENT DOCUMENTS

| | | | |
|---|---|---|---|
| 4,067,555 A * | 1/1978 | Vignardet | B23Q 35/102 901/14 |
| 2021/0197324 A1* | 7/2021 | Prusek | B23K 37/0205 |

* cited by examiner

*Primary Examiner* — Scott R Kastler
(74) *Attorney, Agent, or Firm* — Mark Farrell; Farrell Patent Law PC

(57) ABSTRACT

A portable device for precision plasma and oxy-fuel torch cutting is provided. Versions of an example portable cutting torch tool guide the gun of a cutting torch to make precision linear cuts or curved cuts in a metal workpiece. In an implementation, the device is a gun for a cutting torch, with an integrated rail follower and adjustable vertical and horizontal offsets from a workpiece. The cutting torch tool may use various kinds of rails for stable cuts, with optional movement damping, motorized drive, servos for vertical and horizontal offset, and remote control with user interface.

17 Claims, 16 Drawing Sheets

TOP VIEW

BACK VIEW

LEFT VIEW

RIGHT VIEW

BOTTOM VIEW

PORTABLE DEVICE FOR PRECISION PLASMA AND OXY-FUEL TORCH CUTTING

BACKGROUND

A cutting torch is a device that concentrates energy at a focal point on a surface of a metal or alloy and is moved along the surface to create a cut. Oxy-fuel cutters generate a high enough temperature to heat the metal or alloy to its kindling temperature, at which point oxygen gas combusts the metal(s) to metal oxides at the slit or cutting kerf where the heat and oxygen are being applied. The metal oxides flow out of the cut.

Oxy-acetylene cutting torches reach the highest temperature of any gas cutting system by combining acetylene gas from a first tank with pure oxygen gas from a second tank, but some other fuel gases may be used with pure oxygen for cutting metals. Single-tank torches that mix a fuel gas with atmospheric oxygen do not generally produce enough concentrated heat to melt or oxidize most metals for purposes of cutting.

A plasma cutting torch or "plasma cutter" cuts through electrically conductive metal or alloys by generating an accelerated jet of hot plasma. Plasma cutting enables accurate cuts with no metal chips, and produces a cleaner edge than oxy-fuel cutting. Plasma cutters can cut through materials that are staples for the fabrication industry, such as steel, stainless steel, copper, brass, aluminum, and many other conductive metals and alloys. Using a stream of ionized plasma is relatively inexpensive yet provides precision cutting at high speed. Thus, plasma cutting rigs are easy to obtain for hobbyists, small fabrication shops, automotive repair shops, and metal scrap yards, and large and sophisticated plasma cutting machines are used in commercial and industrial construction and fabrication.

Plasma cutting generates an electrical circuit that includes a "channel" of superheated and electrically ionized gas. The electricity flows from an electrode or an electrode-gas-nozzle of the plasma cutter through the plasma stream generated by the plasma cutter, to the conductive workpiece and back through the workpiece to the plasma cutter though a clamped ("grounding") connection between the plasma cutter and the workpiece, forming a complete electrical circuit.

The ionized plasma is generated via a compressed gas (oxygen, air, inert gas(es), and other gases depending on the nature of the material being cut), which is expelled through the nozzle at high pressure toward the workpiece. An electrical arc is formed within the stream of gas, between an electrode and the workpiece. The electrode can be the gas nozzle itself, or a conductor near the nozzle.

The electrical arc ionizes some of the gas, thereby creating an electrically conductive channel of plasma. As electricity from the cutter torch travels down the plasma stream the electricity creates sufficient heat to melt through the workpiece. Simultaneously, much of the high velocity plasma and compressed gas physically blow the hot molten metal away, thereby cutting through the workpiece in a metal "riddance" process.

Hand-held plasma cutting torches can cut steel plate that is approximately 1.5 inches thick, while commercial units can cut 6 inch thick steel. Many plasma cutters produce a precision cutting cone of ionized plasma, which can be exploited to cut sheet metal along precise straight lines, but also at precise angles and along precise curves.

SUMMARY

A portable device for precision plasma and oxy-fuel torch cutting is provided. Versions of an example portable cutting torch tool guide the gun of a cutting torch to make precision linear cuts or curved cuts in a metal workpiece. In an implementation, the device is a gun for a cutting torch, with an integrated rail follower and adjustable vertical and horizontal offsets from a workpiece. The cutting torch tool may use various kinds of rails for stable cuts, with optional movement damping, motorized drive, servos for vertical and horizontal offset, and remote control with user interface This summary section is not intended to give a full description of systems and methods for aggregating debt to increase bargaining power, or to provide a comprehensive list of features and elements. A detailed description with example implementations follows.

DETAILED DESCRIPTION

Overview

This disclosure describes a portable device, a cutting torch tool, for precision plasma and oxy-fuel torch cutting. In an implementation, the device provides a portable jig for guiding the gun of a cutting torch to make precision linear cuts or curved cuts in a metal workpiece. In another implementation, the device is a gun for a cutting torch, with an integrated rail guide and adjustable vertical and horizontal offsets for following a rail or cam in order to make precision cuts in a metal workpiece.

Example Systems

Figure 1:
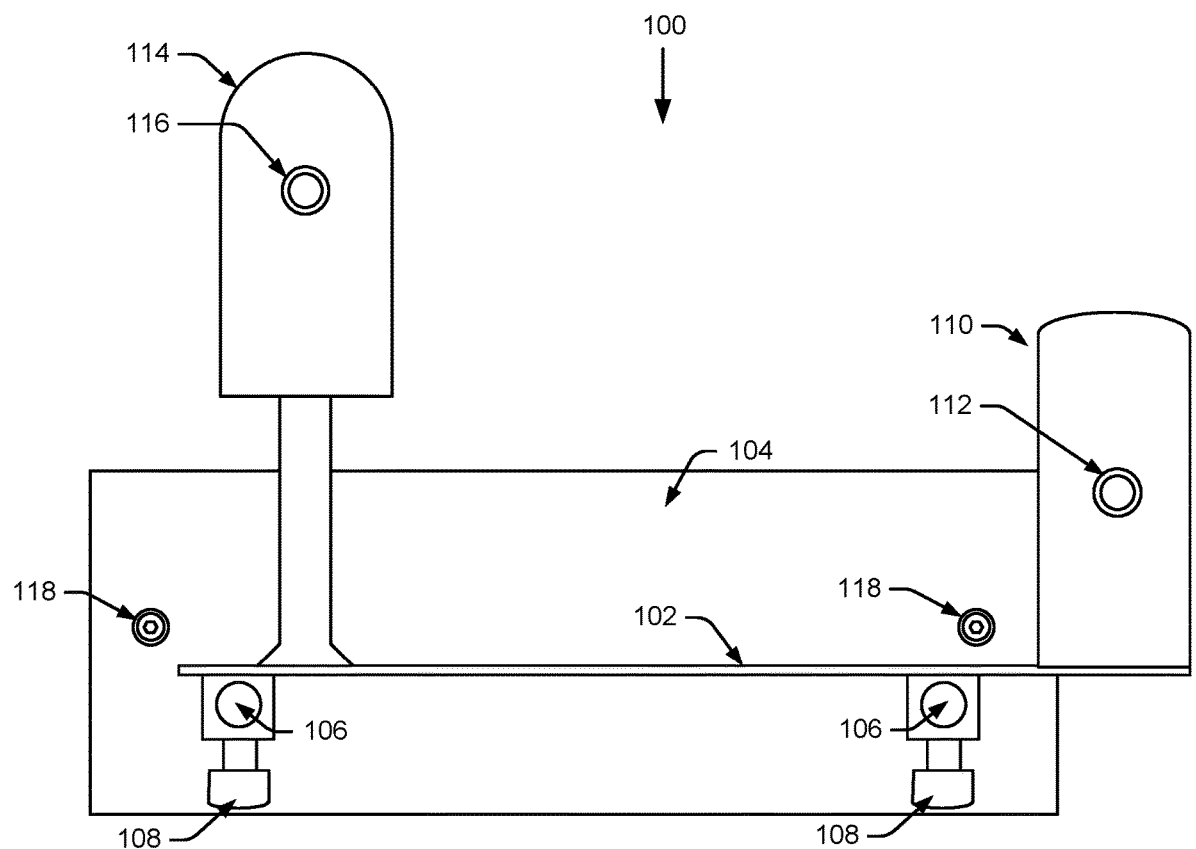
FIG. 1 is a front view diagram of an example cutting torch tool for guiding a cutting torch gun.

FIG. 1 shows an example implementation of the cutting torch tool 100. A horizontal chassis member 102 (side view) is adjustably attached to a vertical plate 104 along pins 106 that allow for adjustment of a horizontal offset between the horizontal chassis member 102 and the vertical plate 104. The horizontal adjustment may be temporarily secured with set screws 108, for a given cut.

The horizontal chassis member 102 supports a first gun holder 110. The first gun holder 110 has a first screw clamp 112 for securing a generic cutting torch gun or oxy-fuel cutting torch gun, and a second gun holder 114 with a second screw clamp 116 also for securing the generic cutting torch gun on a part of the gun, such as the handle, that is a different part of the gun than the part held by the first gun holder 110.

The vertical plate also has set screws 118 for locking the cutting torch gun at a selected vertical height from the workpiece to be cut.

Figure 2:
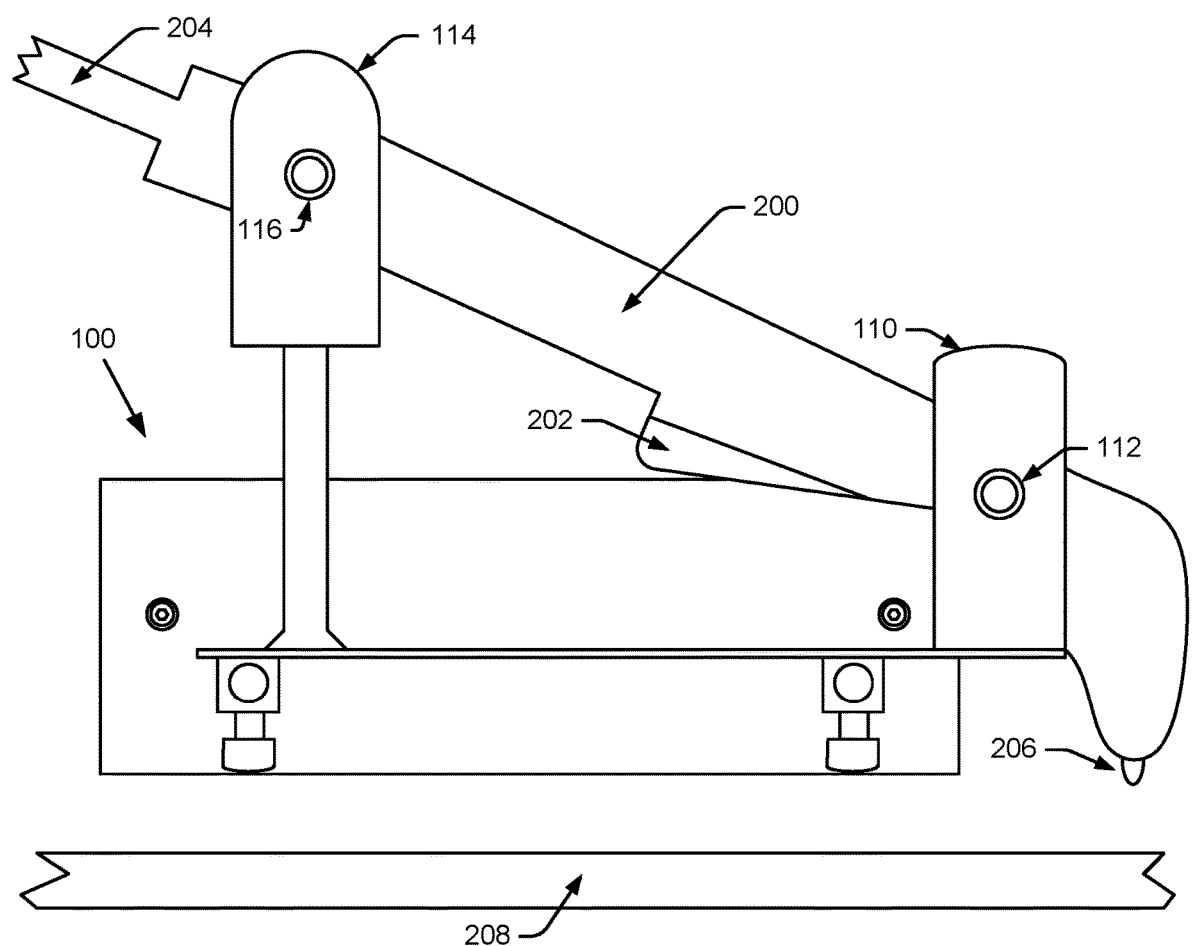
FIG. 2 is another front view diagram of an example cutting torch tool for guiding a cutting torch gun, including a stylized representation of a generic cutting torch gun.

FIG. 2 shows the same example implementation of the cutting torch tool of FIG. 1, with an example generic cutting torch gun 200 loaded in the gun holders 110 & 114. The screw clamps 112 and 116 secure the cutting torch gun 200 into the gun holders 110 & 114. In an implementation, the screw clamps 112 & 116 are replaced with quick-release clamps or other fasteners to hold the cutting torch gun 200 securely in the gun holders 110 & 114. The example cutting torch gun 200 may have a trigger 202 or other control mechanisms attached, which the user can activate by hand, while guiding the gun 200 with the example cutting torch tool 100. The generic cutting torch gun 200 may have one or more gas tubes on an end opposing a nozzle 206, from which ionized plasma cuts the workpiece 208.

Figure 3:
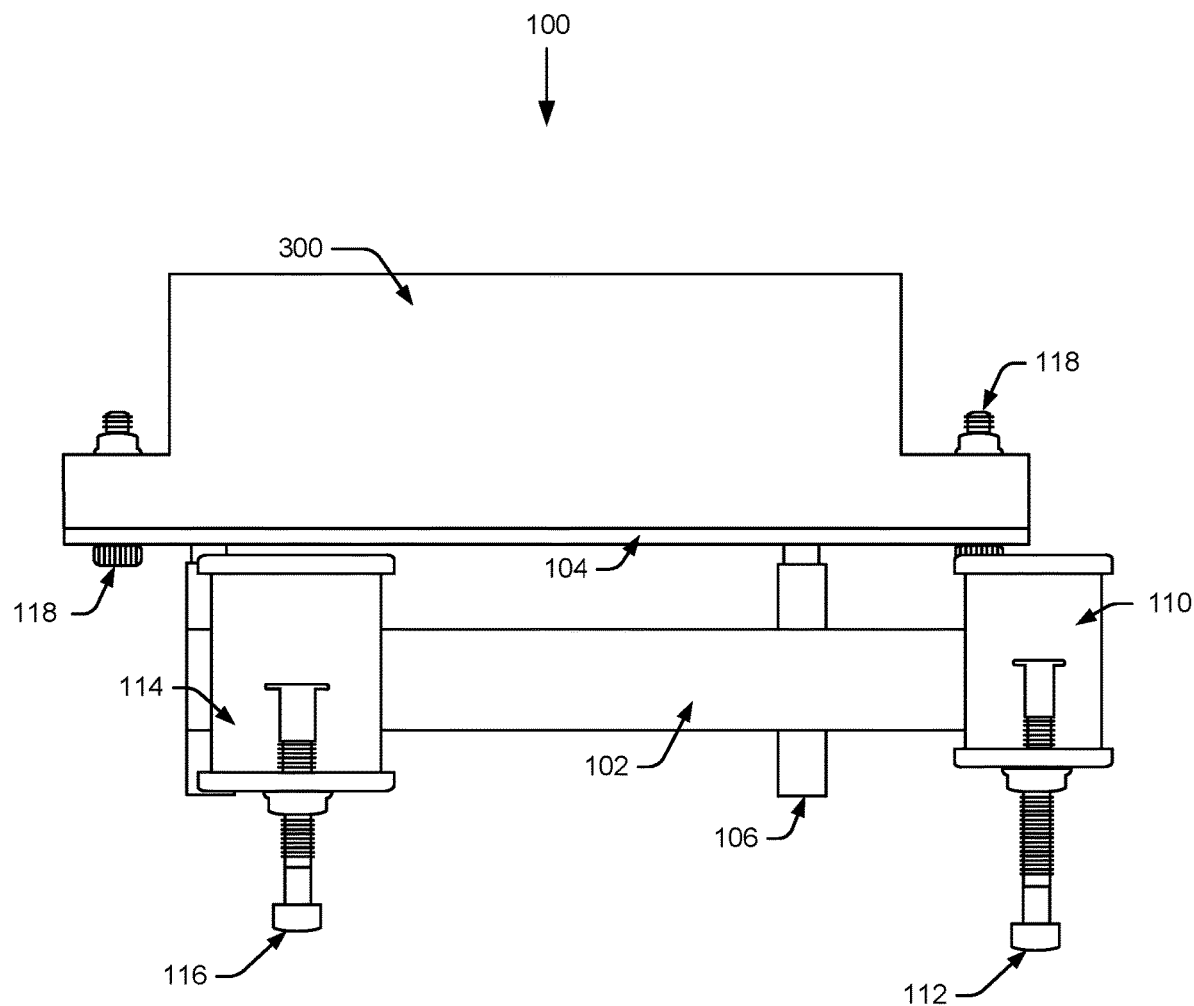
FIG. 3 is a top view diagram of the example cutting torch tool.

FIG. 3 shows a top view of the example cutting torch tool 100. The vertical plate 104 interfaces with a rail follower 300 that guides the tool 100 along a rail, cam, or track. The sliding interface between vertical plate 104 and the rail follower 300 is adjustable. For example, the vertical plate 104 may slide against a face of the rail follower 300, and the screw clamps 118 may allow relative vertical movement via slotted openings in the rail follower 300.

Figure 4:
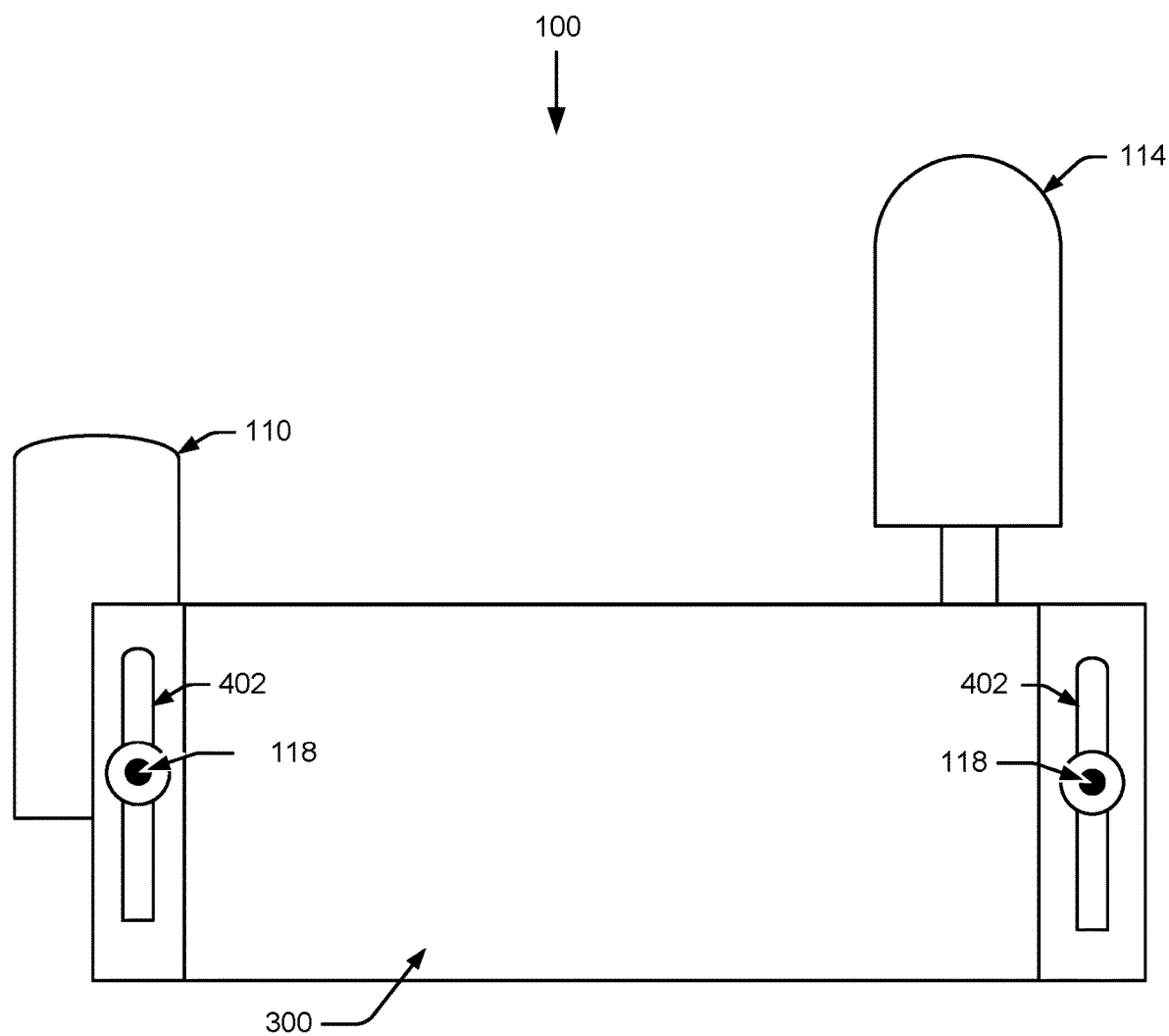
FIG. 4 is a rear view diagram of the example cutting torch tool.

FIG. 4, in a rear view of the example cutting torch tool 100, shows the slotted openings 502 introduced above for vertical adjustment of the vertical plate 104 (not shown in FIG. 4) with respect to the rail follower 300, which rides on a temporary guide rail, cam, or track placed on the workpiece 208 to be cut. The set clamps 118 can be tightened to temporarily secure the vertical plate 104 to the rail follower 300 in a set relation, thereby securing the horizontal chassis member 102 and by extension, the gun holders 110 & 114 and the generic cutting torch gun 200, at a selected vertical height from the workpiece 200. Other fasteners besides screw clamps 118 can be used to temporarily set the vertical height of the vertical plate 104 in relation to the rail follower 300.

Figure 5:
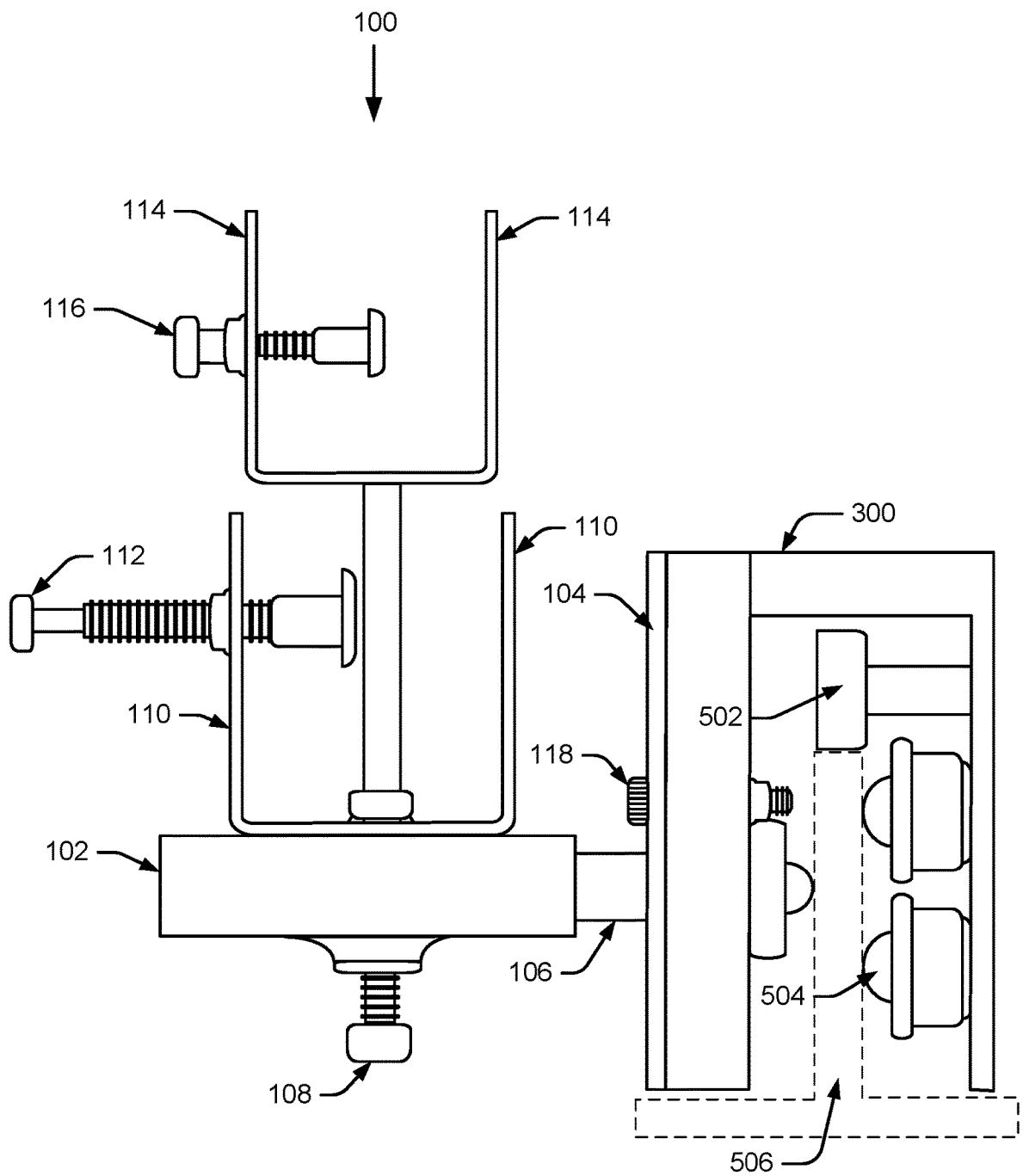
FIG. 5 is a left side view diagram of the example cutting torch tool.

FIG. 5 shows a side view of the example cutting torch tool 100, along a longitudinal axis of movement. In an implementation, the rail follower 300 has various roller balls 502 & 504 that follow a rail or cam, for guiding the cutting torch tool 100 along the workpiece 208. A top roller 502 may ride the flat top of a rail 506 or cam that has a rectangular cross-section. Side roller balls 504 may ride one or both of the sides of the rail 506. The roller balls 504 may be spring loaded to press firmly against the rail 506 or cam to prevent movement of the rail follower 300 in any direction except the direction of intended movement.

Instead of the roller balls 502 & 504 to grasp the rail 506 or cam, an example rail follower 300 may use other mechanisms for sliding along the rail 506 or cam, for movement of the cutting torch tool 100 either by direct force of the user's hand, or by regulated force of the user's hand controlled by a damping mechanism, or by other motorized, electronic, or mechanical means.

Figure 6:
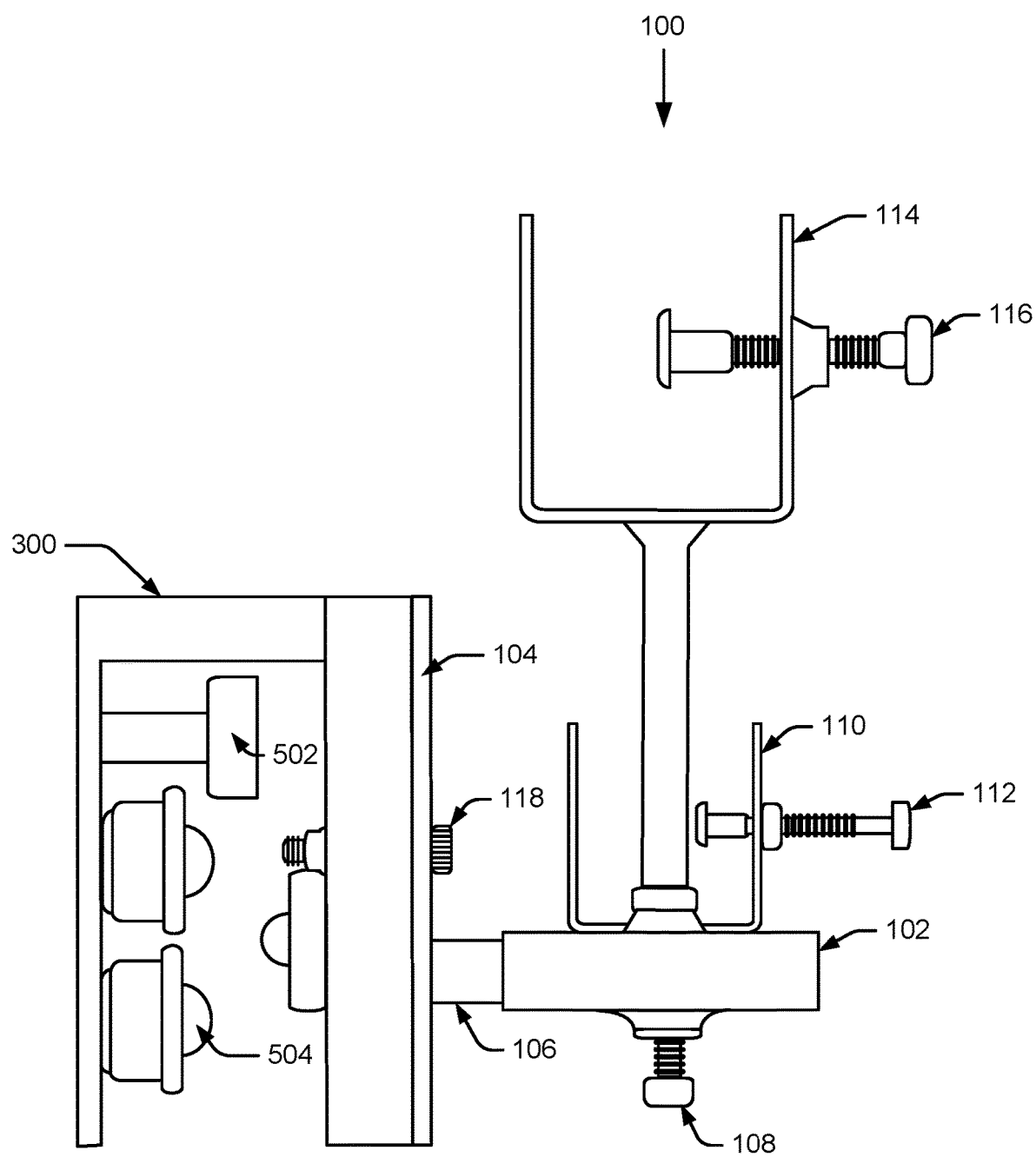
FIG. 6 is a right side view diagram of the example cutting torch tool.

FIG. 6 shows the example cutting torch tool 100 from the right side, as opposed to the left side view of FIG. 5. In an implementation, the example cutting torch tool 100 is not symmetrical in the sense that one gun holder 114 is vertically higher than the other gun holder 110, in order to hold the cutting torch gun 200 at a selected pitch angle with respect to the workpiece 208.

Figure 7:
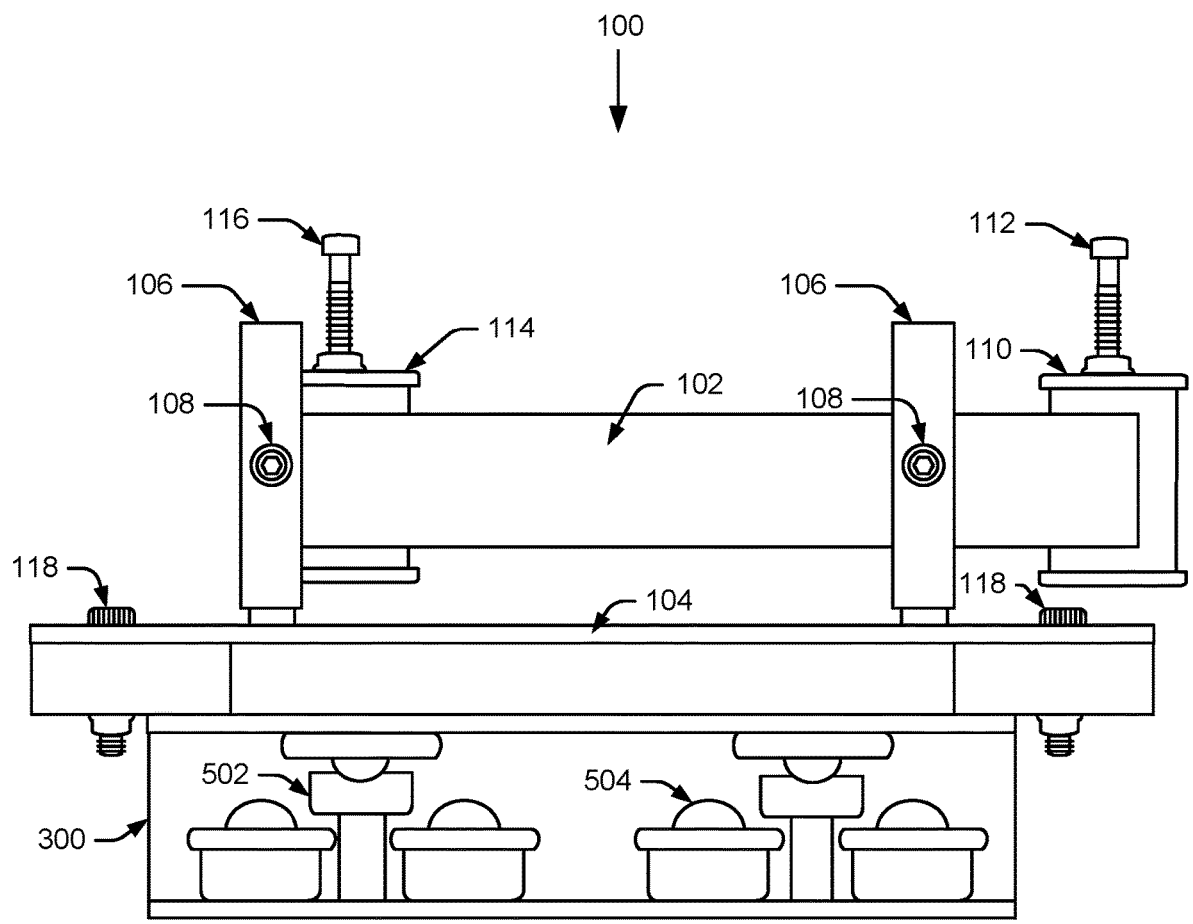
FIG. 7 is a bottom view diagram of the example cutting torch tool.

FIG. 7 shows a bottom view of the example cutting torch tool 100, including set screws 108 for temporarily securing the horizontal chassis member 102 at a selected horizontal offset from the vertical plate 104. This selected horizontal offset has the effect of positioning the plasma gun 200 (FIG. 2) a fixed horizontal distance from the rail follower 300.

The bottom view of FIG. 7 shows that in one implementation, the roller balls 504 are positioned on opposing sides of the rail follower 300 to grasp the rail 506 or cam securely so that there is no unwanted play or looseness in the movement of the cutting torch tool 100 as it makes a cut in the direction of movement along a longitudinal axis of the cutting torch tool 100. Other rail and cam following schemes and mechanisms can be used besides roller balls 502.

Figure 8:
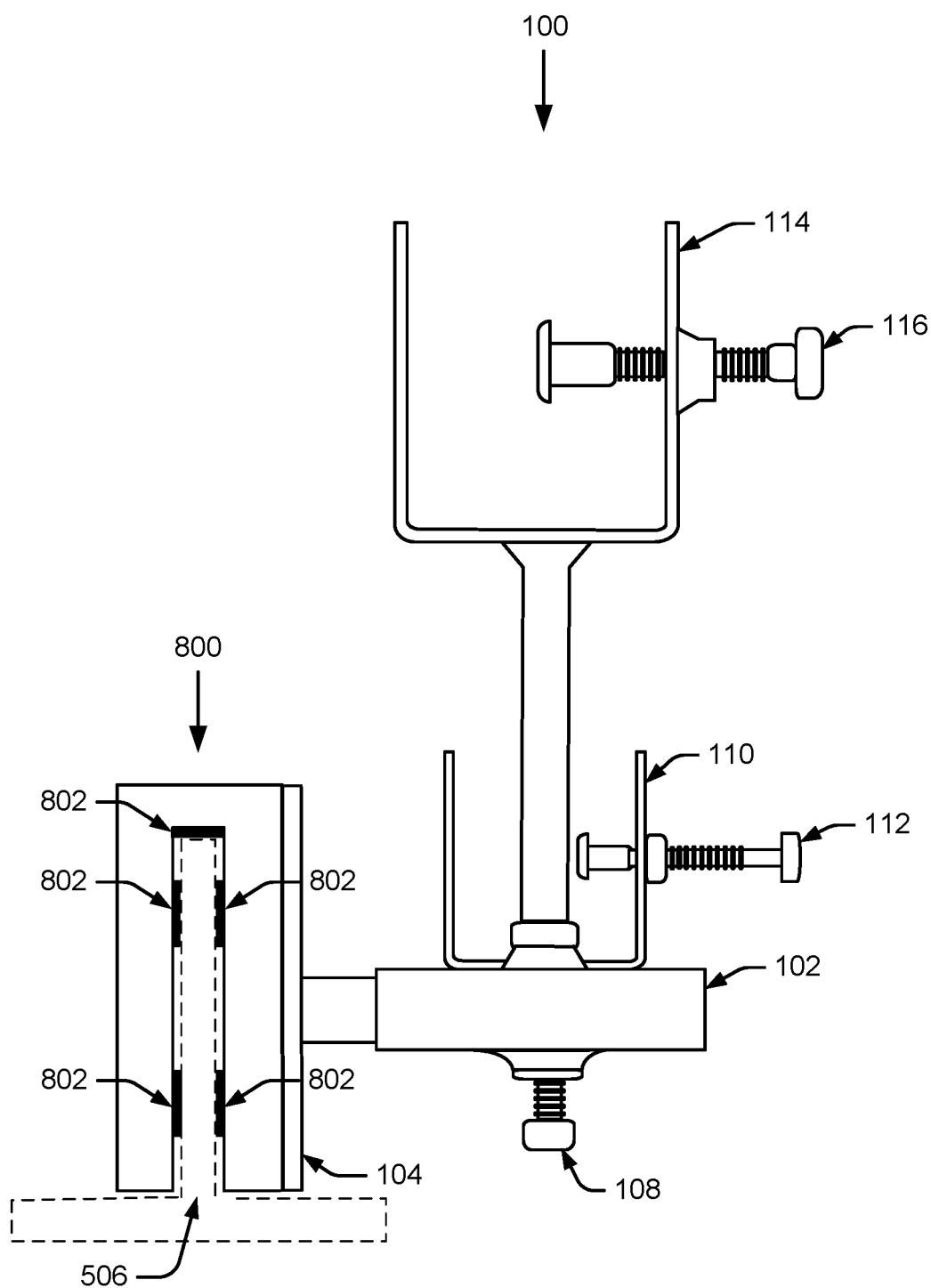
FIG. 8 is a right side view diagram of the example cutting torch tool including an example rail follower with polymer sliding pads.

FIG. 8 shows an example rail follower 800 of the example cutting torch tool 100 in which the interface with a rail 506 or cam consists of smooth polymer surfaces 802, such as polytetrafluoroethylene (PTFE), pressed snugly against surfaces of the rail 506.

Figure 9:
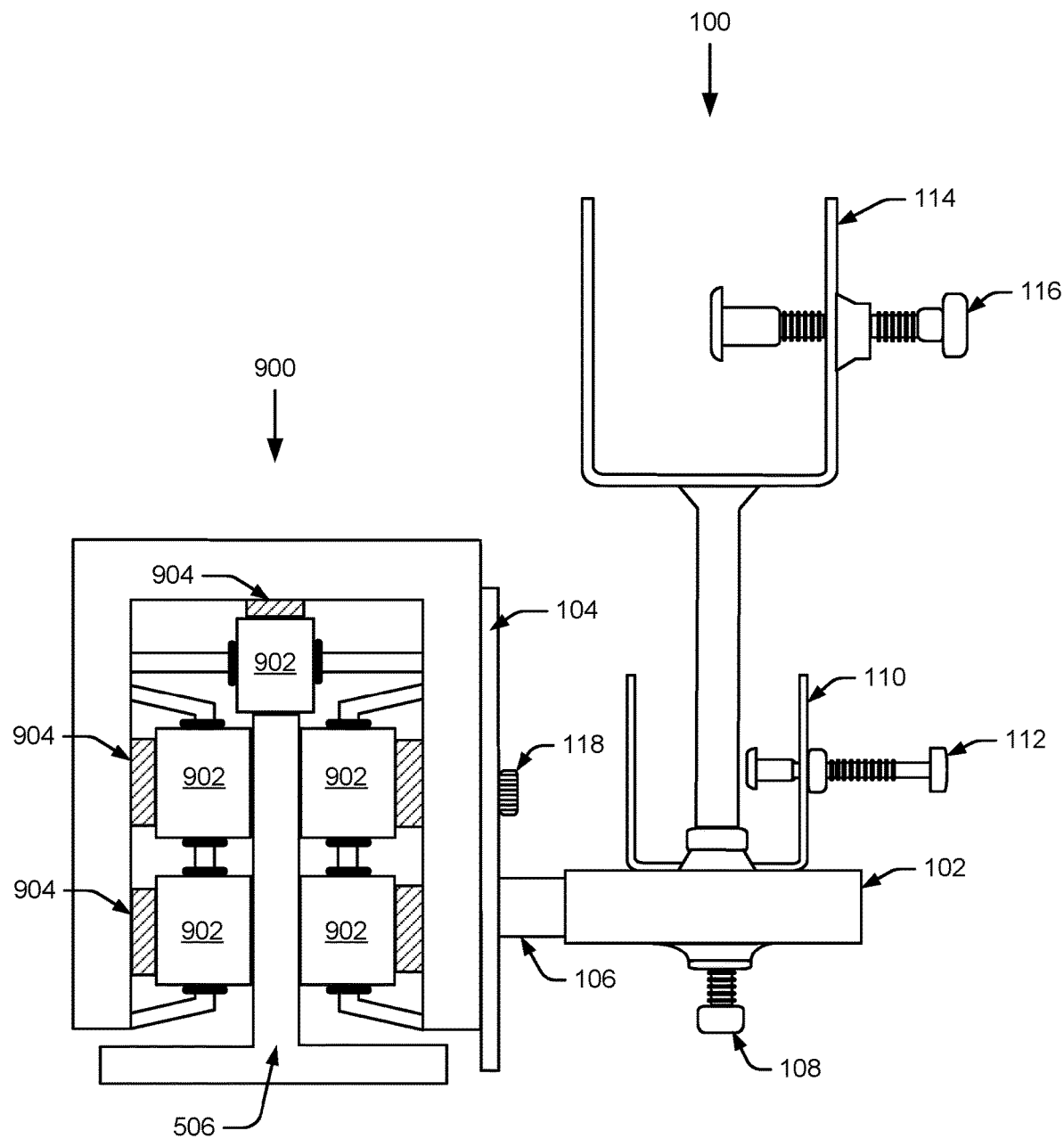
FIG. 9 is a right side view diagram of the example cutting torch tool including an example rail follower with rubber-coated rollers and friction pads for movement damping.

FIG. 9 shows an example rail follower 900 of the example cutting torch tool 100 in which rubber-coated cylindrical rollers 902 snugly contact the rail 506. The rubber-coated cylindrical rollers 902 may be spring-animated to press firmly against the rail 506 to prevent unwanted movement of the cutting torch tool 100 in directions other than the direction of intended movement. In an implementation, one or more of the rubber-coated cylindrical rollers 902 contacts one or more friction pads 904 on an opposing side of the one or more rubber-coated cylindrical rollers 902 from the rail side or cam side of the rubber-coated cylindrical rollers 902. The one or more friction pads 904 dampen movement of the cutting torch tool 100 along the axis of movement, so that the cutting torch tool 100 has a smooth, even motion for uniform and precise cuts, in spite of randomly varying force exerted on the cutting torch tool 100 by a human hand.

Figure 10:
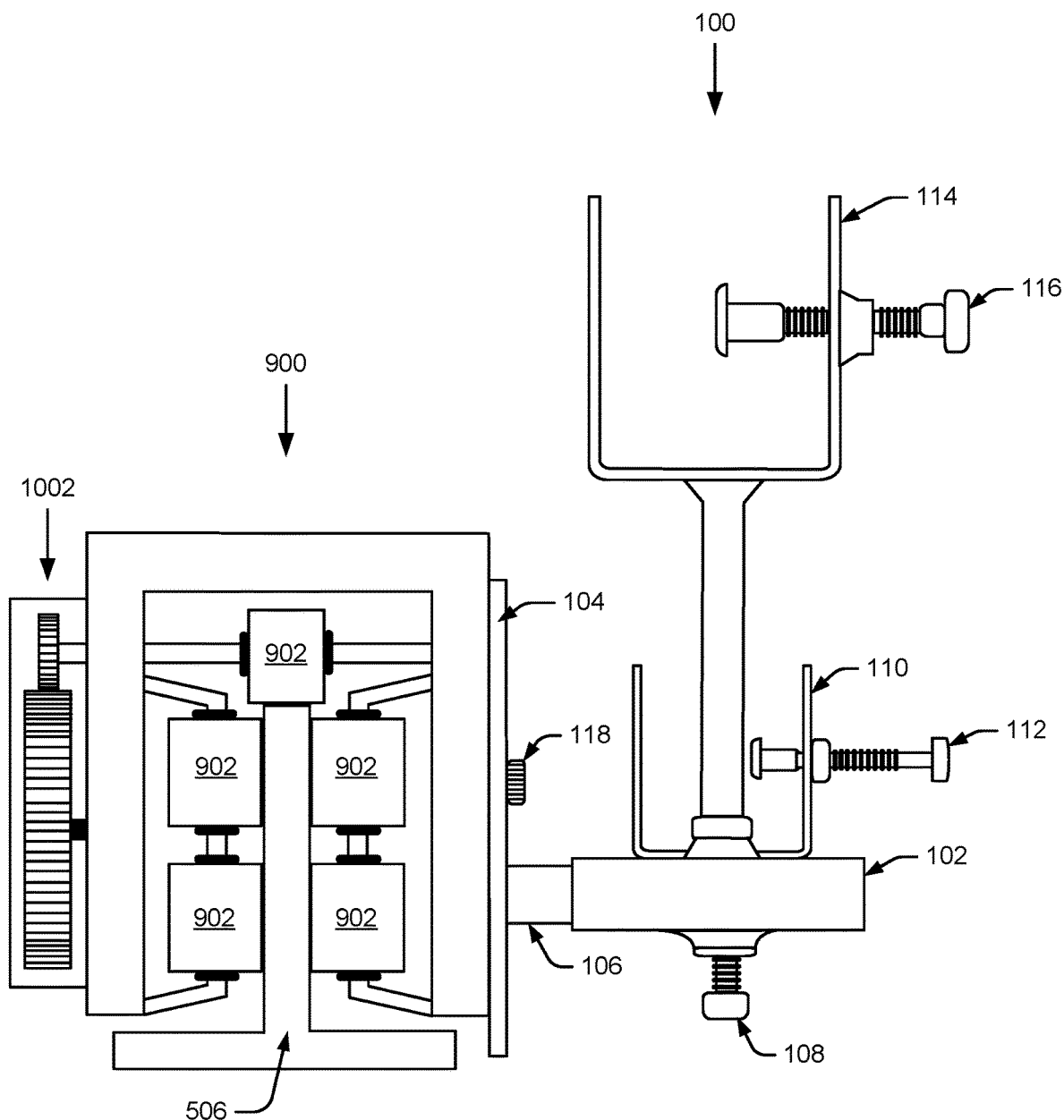
FIG. 10 is a right side view diagram of the example cutting torch tool including an example rail follower with rubber-coated rollers and a gearbox for movement damping.

FIG. 10 shows an example rail follower 1000 of the example cutting torch tool 100, in which rubber-coated cylindrical rollers 902 snugly contact the rail 506. The rubber-coated cylindrical rollers 902 may be spring-animated to press firmly against the rail 506 to prevent unwanted movement of the cutting torch tool 100 in directions other than the direction of intended movement. In an implementation, one or more of the rubber-coated cylindrical rollers 902 is geared to at least a cogwheel or to a gearbox 1002, which may form a gear train or transmission to dampen sudden movements of the cutting torch tool 100 along the rail 506 or cam. The gearbox may increase rotational motion of one or more gears in order to dampen unwanted linear motion of the cutting torch tool 100. Likewise, the gearbox 1002 may include a flywheel or a centrifugal governor to dampen linear force applied by a human hand to the cutting torch tool 100 or to dampen and smooth motion of the cutting torch tool 100 along the rail 506 or cam.

Figure 11:
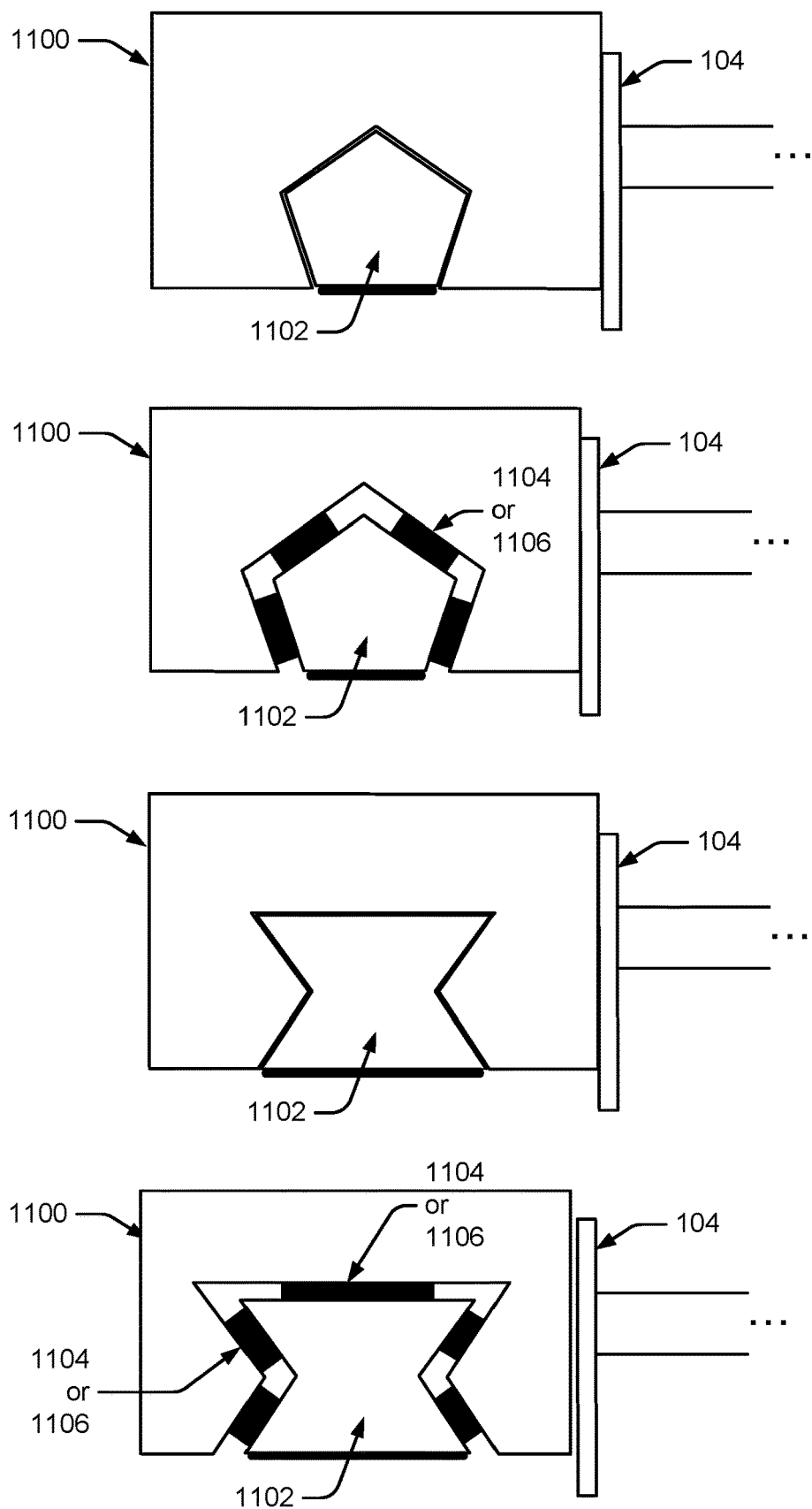
FIG. 11 is a diagram of example rail followers of the cutting torch tool for use with rails of polygonal cross-section.

FIG. 11 shows another implementation of a rail follower 1100, in which the rail 1102 or cam is polygonal, for stable movement of the rail follower 1100 along only the axis of rail 1102 or cam itself, with movement in other directions prevented. The rail follower 1100 may also use cylindrical rollers 1104 or polytetrafluoroethylene (PTFE) slider pads 1106 against one or more faces of the polygonal rail 1102 or polygonal cam, for smooth, stable motion.

Figure 12:
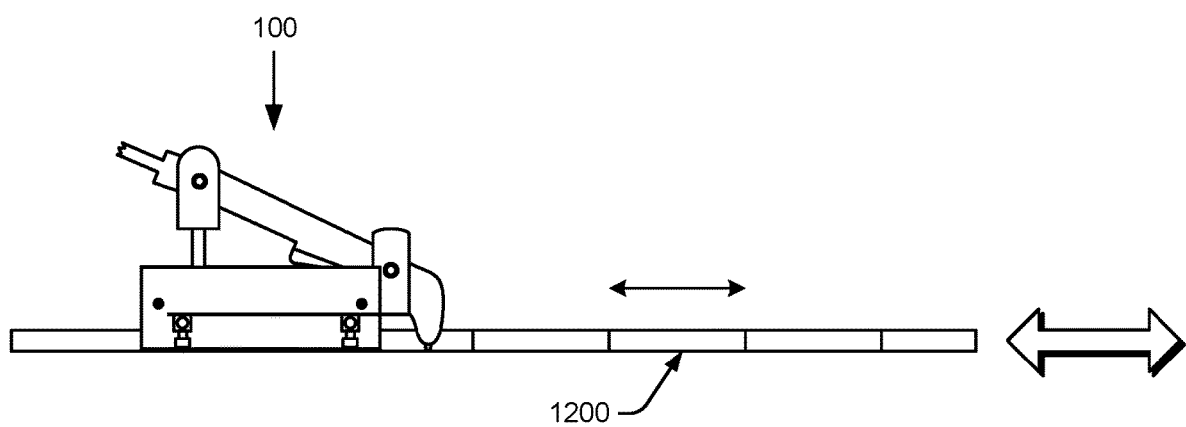
FIG. 12 is a diagram of an example extendible and contractible rail as part of the example cutting torch tool.

FIG. 12 shows a rail 1200 included with the cutting torch tool as an apparatus or system, in one implementation. In an implementation, the rail 1200 can be made compact and more portable by being extendible and contractible. In one version, the telescoping rail 1200 may narrow slightly along its extended length, but cylindrical rollers 902 or roller balls 504 in the rail follower 300 of the cutting torch tool 100 are biased by one or more springs to compensate for small variances in the thickness or width of the extendible rail 1200.

Figure 13:
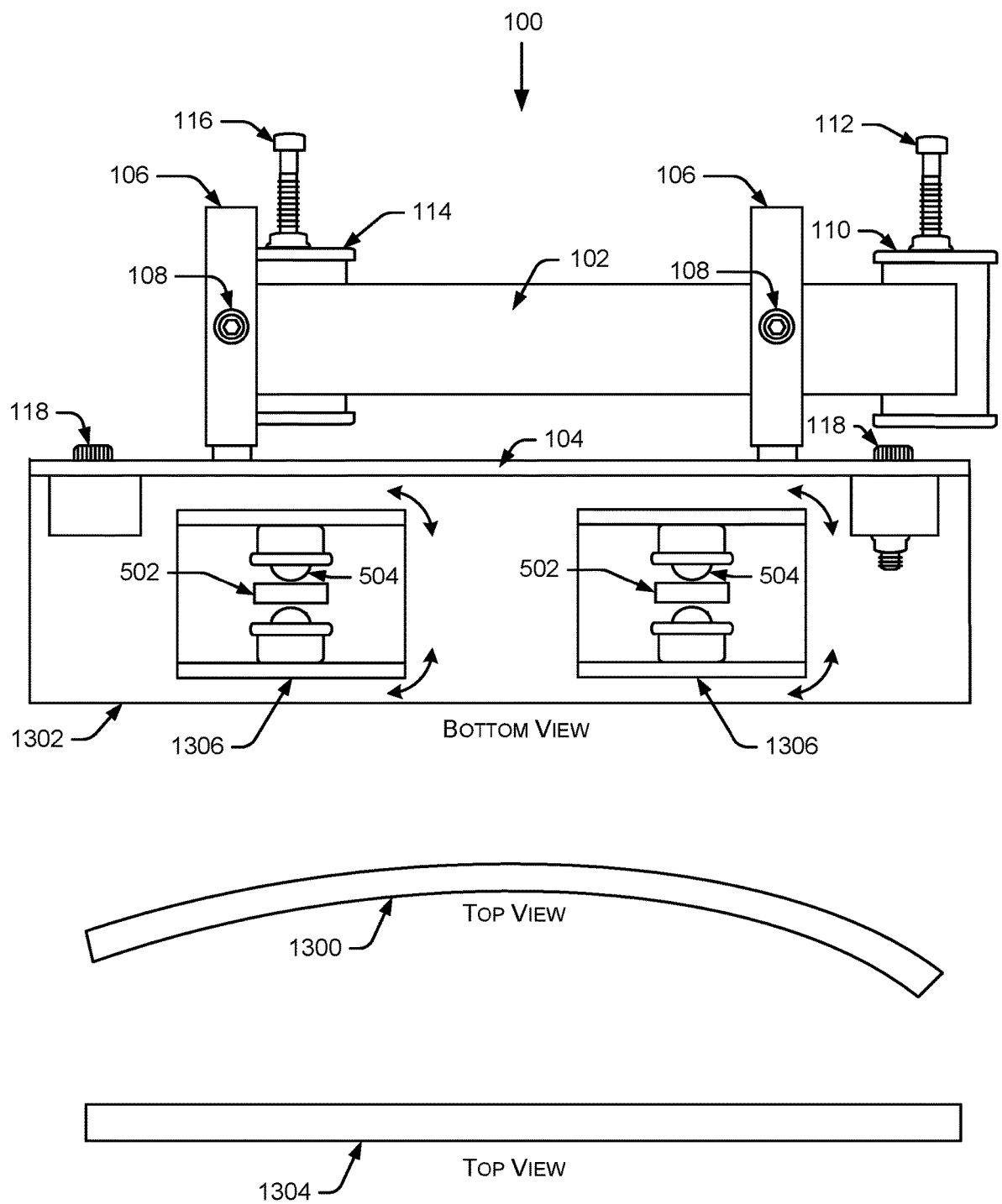
FIG. 13 is a diagram of an example rail follower of the example cutting torch tool with pivotable sections for following curved rails, cams, or tracks for plasma cutting with the cutting torch tool.

FIG. 13 shows an implementation of the cutting torch tool 100, in which the rail 1300 or rails come with the cutting torch tool 100 as an accessory or within a kit, and the rail follower 1302 of the cutting torch tool 100 can comply to a curved rail 1300 or rails, as well as to a linear rail 1304. In one version, the example kit includes curved sections of rail 1300 with various curvatures which can be connected together in different combinations to make various curved cuts with the cutting torch tool 100. An example rail follower 1302 for following a curved rail 1300 or cam can follow curves by having at least one pivotable section 1306, for example. There are other ways of making the rail follower 1302 reliably compliant to curves. For example, cylindrical rollers or roller balls under spring tension can comply with curves in the rail 1300 without allowing unwanted play into the movement of the rail follower 1302 and by extension, the cutting torch tool 100.

Figure 14:
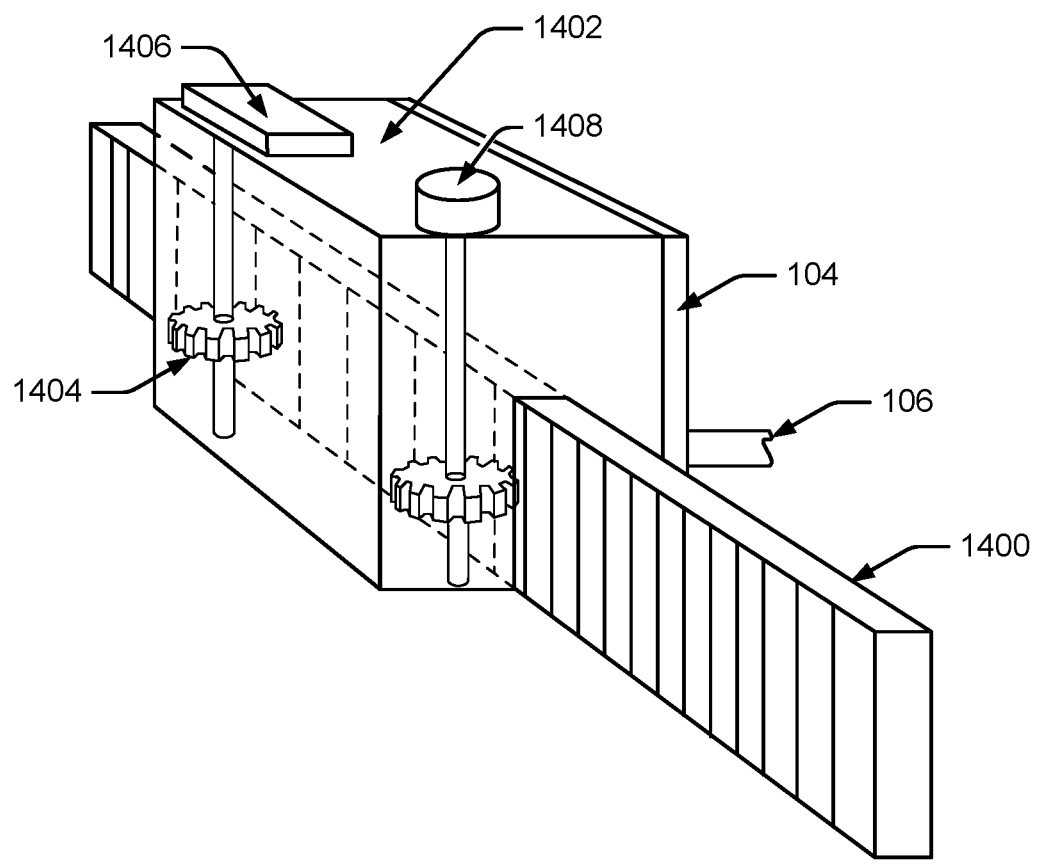
FIG. 14 is a diagram of a geared rail with rack of gear teeth for the cutting torch tool and a rail follower with gears for connection to a damping module or a drive motor.

FIG. 14 shows a rail 1400 composed of a rack of geared teeth on at least one side of the rail 1400 or cam. The complementary rail follower 1402 has at least one gear 1404 that meshes with the rack of teeth on the rail 1400, providing a geared interface between the rail follower 1402 and the rail 1400 or cam. The one or more gears on the rail follower side of the geared interface can be connected to a gearbox 1406 for damping or controlling motion of the rail follower 1400 along the rail 1400. Alternatively, the one or more gears on the rail follower side of the geared interface can be connected to a motor 1408 either directly or indirectly. The speed of the motor, and thus the speed of traverse of the cutting torch tool 100 across the workpiece, can be controlled by an onboard controller, such as a trigger connected to a rheostat or potentiometer for controlling variable speed, or the speed of the motor may be controlled remotely, by a remote control module, for hand-free operation of the cutting torch tool 100.

In an implementation, the rail 1400 composed of a rack of geared teeth is flexible, and can be shaped into one or more curves and applied to the workpiece with temporary adhesive or suction, or temporarily affixed into curves by securing at each end. The horizontal adjustment allowed by the pins 106 and set screws 108 can enable the rail follower 1402, while following a flexible rail 1400, to be kept a safe distance from any heat caused by the ionized plasma and cutting process.

Figure 15:
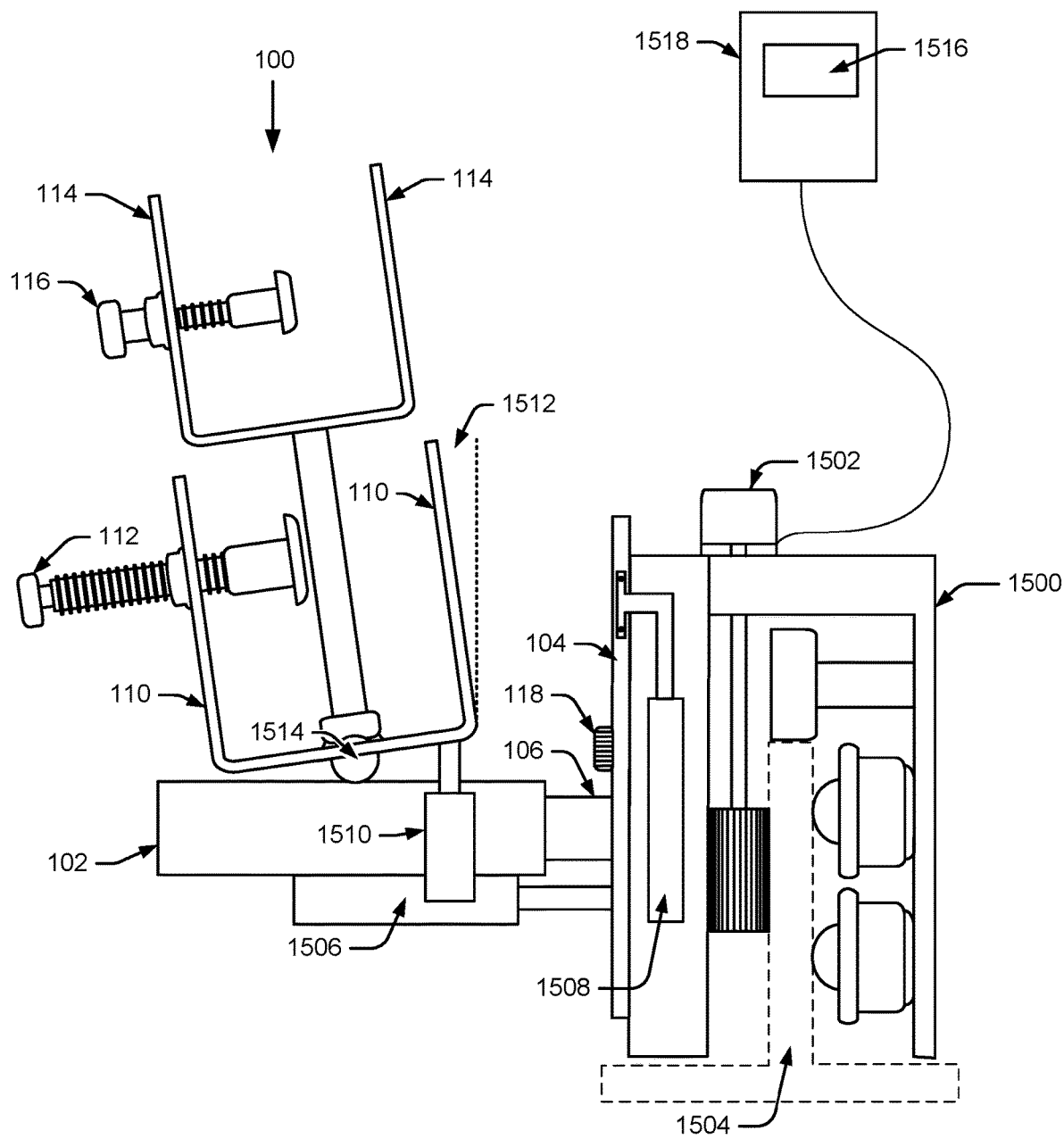
FIG. 15 is a right side view diagram of an example cutting torch tool with geared interface to a rail, cam, or track, drive motor, servos for horizontal, vertical, and angular adjustment, and remote control with user interface.

FIG. 15 shows an implementation of the cutting torch tool 100 in which the rail follower 1500 is motorized with one or more motors 1502 to follow a rail 1504, cam, or track, and the horizontal and vertical adjustments may be remotely controllable by horizontal and vertical servos 1506 & 1508. The may be more than one servo for each horizontal or vertical direction of adjustment.

Another servo 1510 may allow adjustment of a vertical angle 1512 (angular offset) of the gun holders 110 & 114, for making angled cuts into a metal or alloy workpiece. In an implementation, this angular adjustment may be set manually, or may be controlled by one or more angular servos 1510 as in FIG. 15. An example pivotable attachment 1514 of the horizontal chassis member 102 allows angular adjustment of the cutting torch gun 200 with respect to the workpiece 208 to be cut.

A user interface 1516 on a remote control 1518 allows the user to input vertical and horizontal positioning coordinates and cutting speed. Alternatively, the remote 1518 can allow real time remote control of positioning and cutting, with parameters dynamically changeable as the cut is being made.

Figure 16:
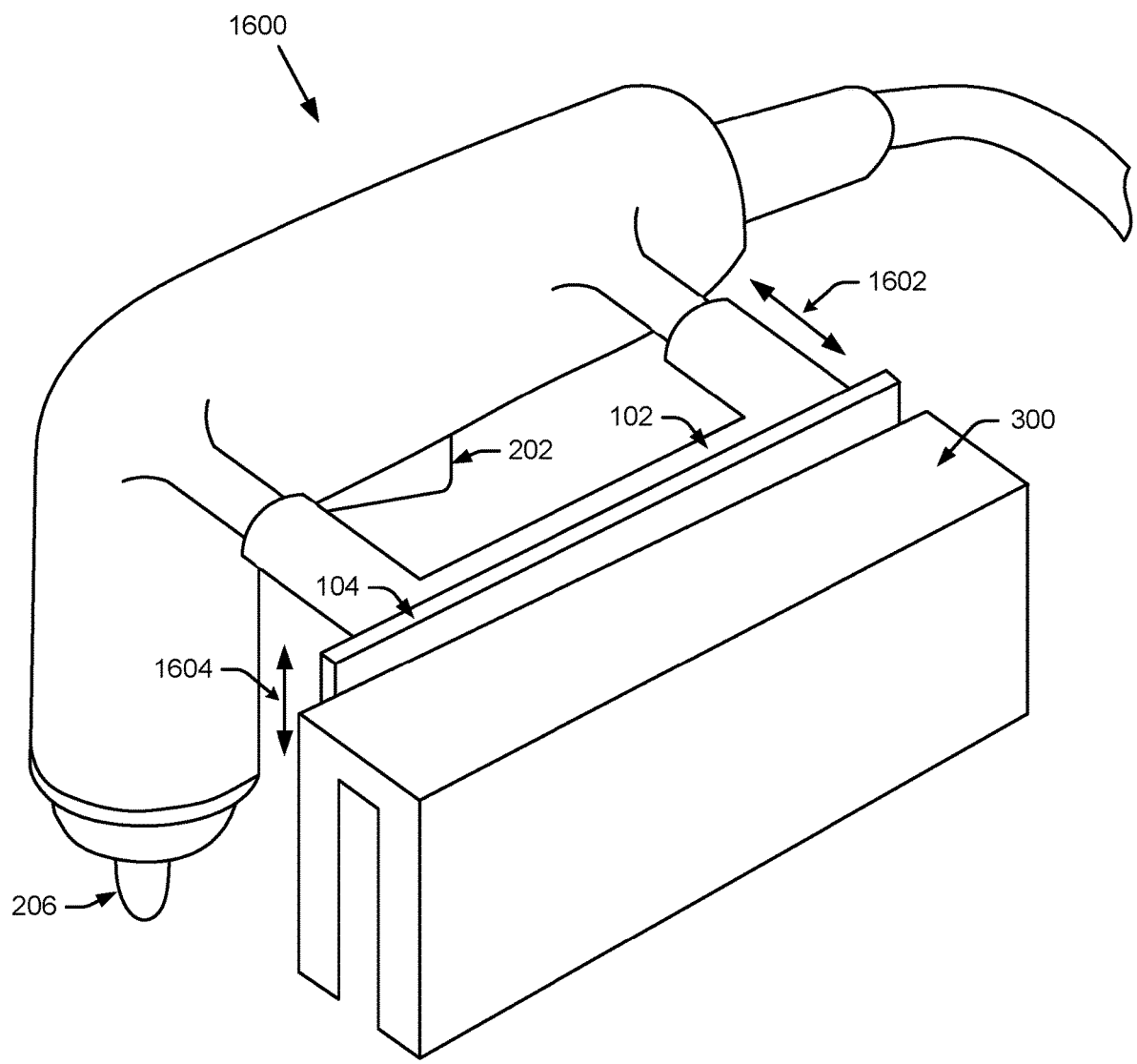
FIG. 16 is a diagram of an example integral cutting torch gun, with integral rail follower and adjustable vertical and horizontal offsets with respect to a workpiece.

FIG. 16 shows an example cutting torch gun 1600 embodying the features of the cutting torch tool 100. The features are integrated into the example cutting torch gun 1600 to make an integral single unit. In this implementation, the example cutting torch gun 1600 includes a focused nozzle 206 for making a stream of electrically conductive ionized gas, at least one electrode, and includes the gas-handling features of cutting torches. The integral cutting torch gun 1600 also includes integral attachment to a horizontal chassis member 102 with a variable horizontal offset 1602 from an integral vertical plate 104. The integral vertical plate 104, in turn, has a variable vertical offset 1604 with respect to a rail follower 300, which is also an integral part of the example integral cutting torch gun 1600. The example cutting torch gun 1600 is integrated into its own cutting torch system, including gas supply and electrical supply and control, while embodying the features of the cutting torch tool 100 described above with respect to FIGS. 1-15.

In an implementation, the example integral cutting torch gun 1600 may also be outfitted with a damping module to regulate a speed of movement of the rail follower along a rail 506 or cam with respect to a force or pressure applied by a user. The example integral cutting torch gun 1600 may also be outfitted with a motorized drive, and/or servos for vertical and horizontal positioning of the ionized plasma cutting stream. When outfitted with electrical or electromechanical drive and/or control components, the example integral cutting torch gun 1600 may also be outfitted with onboard or remote controls and user interface.

Conclusion

Although exemplary systems and apparatuses have been described in language specific to structural features and/or functional acts, it is to be understood that the subject matter defined in the appended claims is not necessarily limited to the specific features or acts described. Rather, the specific features and acts are disclosed as exemplary forms of implementing the claimed systems and structures.

The invention claimed is:

1. An apparatus for a toolkit of portable handheld tools, comprising:
   a rail follower for moving along a cam to guide a cutting torch for cutting a workpiece;
   a vertical plate adjustably attached to the rail follower for holding a horizontal chassis member at selectable vertical heights from the workpiece;

the horizontal chassis member adjustably attached to the vertical plate for holding a gun of the cutting torch at an adjustable horizontal offset from the vertical plate, the horizontal chassis member having a longitudinal axis disposed in parallel with a linear instance of the cam or tangential to a curved instance of the cam at a current cutting position on the workpiece;

wherein the cam comprises a rack of geared teeth;

wherein the rail follower comprises a geared interface with the cam; and wherein the rail follower comprises a geared damping mechanism to regulate a speed of the gun of the cutting torch across the workpiece.

2. A portable device for precision plasma and oxy-fuel torch cutting of a workpiece, comprising:

a horizontal chassis member adjustably attached to a vertical plate along pins attached at a right angle to the vertical plate, the pins allowing adjustment of a horizontal offset between the horizontal chassis member and the vertical plate;

a first gun holder attached to the horizontal chassis member, the first gun holder comprising a first screw clamp to secure a front part of a gun of a plasma cutter or of an oxy-fuel torch to the horizontal chassis member;

a second gun holder attached to the horizontal chassis member, the second gun holder comprising a second screw clamp to secure a different part of the gun to the horizontal chassis member, wherein the second gun holder is vertically higher from the workpiece to be cut than the first gun holder;

the vertical plate comprising third screw clamps for locking the gun at a selected vertical height from the workpiece to be cut;

a rail follower adjustably interfacing with the vertical plate;

a sliding interface between the rail follower and the vertical plate;

the third screw clamps and slotted openings of the rail follower to secure the vertical plate at a fixed vertical offset with respect to the rail follower; and the rail follower to ride on a guide rail, a cam, or a track placed on the workpiece to be cut.

3. The apparatus of claim 2, further comprising quick-release clamps attached to the horizontal chassis member for securing the gun to the horizontal chassis member.

4. The apparatus of claim 2, wherein the rail follower contacts three sides of the guide rail, cam, or track, and comprises roller ball bearings in direct contact with at least two opposing sides of the guide rail, cam, or track.

5. The apparatus of claim 2, wherein the rail follower comprises a polytetrafluoroethylene (PTFE) surface in direct contact with the guide rail, cam, or track.

6. The apparatus of claim 2, further comprising a linear cam comprising a straight rail to guide the rail follower.

7. The apparatus of claim 6, wherein the linear cam comprising the straight rail is extendible and contractible.

8. The apparatus of claim 2, wherein the rail follower includes at last one pivotable section to follow a curved guide rail, cam, or track.

9. The apparatus of claim 8, further comprising a curved cam for making a curved cut with the portable device.

10. The apparatus of claim 8, further comprising a set of curved cam sections capable of being assembled in various orders to create custom curved rails to guide the rail follower.

11. The apparatus of claim 2, wherein the cam comprises a polygonal cross section and the rail follower comprises a polygonal opening to fit the cam and comprises cylindrical rollers to contact the cam.

12. The apparatus of claim 2, wherein the rail follower comprises a damping member to regulate a movement speed of the portable device across the workpiece.

13. The apparatus of claim 2, wherein the rail follower comprises rollers in contact with the cam and a geared damping mechanism with a flywheel or a centrifugal governor geared to the rollers in contact with the cam.

14. The apparatus of claim 1,
wherein the rail follower comprises a motorized drive attached to at least one gear to regulate a speed of the gun of the cutting torch across the workpiece, the motorized drive including a controller for varying the speed of the motorized drive in real time.

15. The apparatus of claim 14, further comprising a user interface for remotely inputting user-selectable speeds in real time to the motorized drive or for remotely user-controlling the motorized drive in real time.

16. The apparatus of claim 15, further comprising servos or motors to control the selectable vertical height, the horizontal offset, and an angle of the gun with respect to a vertical plane of the vertical plate, wherein the user interface enables a user to control a speed of movement, the vertical height, the horizontal offset, and the angle of the gun with respect to the vertical plane of the vertical plate.

17. The portable device of claim 2, further comprising set screws of the horizontal chassis member to secure the horizontal offset between the horizontal chassis member and the vertical plate via the pins for a given workpiece.

* * * * *